United States Patent Office 3,442,630
Patented May 6, 1969

3,442,630
GASOLINE CONTAINING DIAMINE SALT OF A BRANCHED CHAIN CARBOXYLIC ACID
Weldon G. Annable, Crystal Lake, and Frederick L. Mueller, Arlington Heights, Ill., assignors, by mesne assignments, to Union Oil Company of California, Los Angeles, Calif., a corporation of California
No Drawing. Filed Apr. 23, 1962, Ser. No. 189,315
Int. Cl. C10l 1/22
U.S. Cl. 44—66
14 Claims This invention relates to new and useful improvements in gasoline compositions and more particularly to gasoline containing additives for inhibiting carburetor icing.

In carbureted motor vehicle engines, liquid fuel is metered to the intake air upstream relative to the throttle under all operating conditions except idle, or very light load. Evaporation of the fuel lowers the fuel-air mixture temperature, and hence the throttle temperature, by an amount dependent, among other things, upon the amount of fuel vaporized and the latent heat of evaporation of the fuel.

When ambient temperatures range from about 30° to 60° F. and the relative humidity is about 65% or higher, up to 100%, this reduction in the temperature of the fuel-air mixture can cause sufficient water to condense and freeze in the throttle area to cause trouble. The phenomenon commonly manifests itself in annoying engine stalls upon return to idle during the warm-up period, but can also result in load throttle restriction in severe cases. In the latter instance, the vehicle driver may be unaware of the condition until an attempt is made to pass another vehicle, climb a grade, or suddenly increase speed.

The natural heat reaching the carburetor throttle body from the engine, its exhaust system, and its cooling-liquid system is the main factor which acts to prevent the occurrence of icing or stalling conditions unless additives are present in fuel which prevent the formation of ice on the throttle plate. In the past, a number of different types of additives have been used in gasoline compositions to inhibit ice formation in the carburetor, but all such additives have been subject to various defects. Furthermore, it has been difficult to evaluate the performance of fuel compositions in motor vehicles. The transitory nature of the stalling problem, and the fact that heat transfer to the throttle body is not the same for different makes and models of vehicles, or even for similar models with different induction systems, obviates the possibility of successfully evaluating fuel performance in the vehicles themselves. Nevertheless, test methods have been developed for determining the carburetor icing tendencies of gasolines based upon measurements of the change in manifold vacuum resulting from carburetor ice formation.

In the past, the tendency of gasolines toward carburetor ice formation has been alleviated sometimes by incorporation in the fuel of certain water-soluble freezing point depressants, such as alcohols, including glycols, or the like. In particular, isopropyl alcohol and mixtures of isopropyl alcohol and isopropyl ether have been used to inhibit carburetor icing. However, the use of alcohols and similar water-soluble freezing point depressants requires relatively large concentrations of the additive, for example from about 0.05% to as high as 4 or 5%. In commercial practice, it has been uneconomical to use a sufficient amount of water-soluble additives of this type to provide adequate protection against carburetor icing.

The use of alcohols and similar water-soluble freezing point depressants as anti-icing additives results in a further problem. There is a marked tendency for the additive to be leached out of the fuel by contact with water. During normal handling of gasoline, it is quite difficult to avoid contact between the fuel and water due to the presence of small amounts of water in the bottoms of storage tanks. When the additive is leached from the fuel, the fuel loses its protection against carburetor icing.

There have been attempts made to use other anti-icing additives in gasolines but without any substantial success. Gasoline compositions have been prepared using water-insoluble organic compounds as anti-icing additives. These compounds apparently prevent icing by means of a lubricating or detergent action which prevents accumulation of ice particles in the carburetor. Organic water-insoluble additives of this type are operative at relatively low concentrations in the fuel, but have generally been subject to the objection that they produce undesirable deposits in the engine or have been difficult to blend with gasolines in the field at terminals or other distribution points because of their tendency to crystallize at low temperatures or to precipitate from concentrated solutions at low temperatures.

This latter problem, i.e., crystallization at low temperatures when in neat form, or precipitation from concentrated solutions at low temperatures prior to addition to gasoline, is commonly encountered when the anti-icing additive is provided commercially to be blended with gasoline in the field, as at bulk plants, pipeline terminals, and other distribution points. Such practice is common to avoid loss of the additive from the gasoline during transport through pipelines, etc. Under such circumstances, it may be necessary to blend the neat additive or a concentrated solution of it in hydrocarbon solvent with the gasoline at ambient temperatures as low as −30° F., the blending being accomplished by means of metering or proportioning pumps.

Several difficulties are encountered if the additive crystallizes at low temperatures. For example, if it crystallizes as a wax-like mass, it cannot be handled without heating. Heating facilities, of course, usually are not available. This can be countered to some extent by adding 30–50% of a hydrocarbon solvent to the additive but, in most cases, the material still tends to crystallize and to precipitate from solution at low temperatures. When this occurs, addition of the additive to the gasoline is not uniform; sometimes additive is pumped, and sometimes only the solvent is pumped. This, of course, is undesirable.

On the other hand, if the additive solidifies as a glass (mal-crystalline) at low temperatures, rather than as a wax-like mass, a 70% solution of it in a hydrocarbon solvent will remain clear, fluid, and uniform, even at very low temperatures, and the additives can be added uniformly to the gasoline.

It is therefore one object of this invention to provide a new and improved gasoline composition containing an anti-icing additive.

Another object of this invention is the provision of a gasoline composition containing a water-insoluble anti-icing additive which composition is characterized by freedom from formation of engine deposits and freedom from crystallization of the additive during low temperature storage of concentrated solutions of the additive prior to its addition to gasoline.

A feature of this invention is the provision of a new and improved gasoline composition containing a small amount of a branched-chain fatty acid salt of a fatty diamine in an amount sufficient to inhibit icing tendencies of the gasoline.

Other objects and features of this invention will become apparent from time to time throughout the specification and claims as hereinafter related.

This invention is based upon our discovery that the addition of small amounts of diamine salts of the formula $$R^2 \cdot R-\underset{\underset{H}{|}}{N}-R^1-NH_2 \cdot R^2$$

where R is a $C_{12}$–$C_{30}$ hydrocarbon radical, $R^1$ is a $C_2$–$C_{20}$ divalent hydrocarbon radical, and $R^2$ is a $C_4$–$C_{30}$ branched-chain carboxylic acid, to gasoline will inhibit the tendency of the gasoline toward carburetor ice formation. These anti-icing additives have no substantial tendency to form undesired engine deposits and do not tend to crystallize from concentrated solutions in hydrocarbons under low temperature storage conditions prior to addition to the gasoline. The proportion of the additive used in gasoline is not especially critical; the additive can be used in amounts ranging from 1 or 2 parts per million (p.p.m.) up to the limit of solubility of the additive in the gasoline at low temperatures. The optimum concentration of the additive in the gasoline from an economic standpoint, and from the standpoints of maximum anti-icing effect and maximum inhibition of engine deposits, is in the range of about 10 to 200 p.p.m. (parts per million).

The additives which are used in accordance with this invention are produced by reacting one mole of a fatty diamine with 2 moles of a $C_4$–$C_{30}$ branched-chain carboxylic acid at a temperature in the range from about 100° to 200° F., preferably about 160°–175° F., for at least 15 minutes. Representative amines and acids which can be reacted to form the additives in accordance with this invention are as follows:

*Fatty diamines*:
$C_{12}H_{25}NHC_2H_4NH_2$
$C_{16}H_{33}NHC_{12}H_{24}NH_2$
$C_{16}H_{33}NHC_{20}H_{40}NH_2$
$C_{18}H_{37}NHC_{18}H_{36}NH_2$
$C_{12}H_{25}NHCH_2CH_2CH_2NH_2$
$C_{14}H_{29}NHCH_2CH_2CH_2NH_2$
$C_{16}H_{33}NHCH_2CH_2CH_2NH_2$
$C_{18}H_{37}NHCH_2CH_2CH_2NH_2$
$C_{16}H_{31}NHCH_2CH_2CH_2NH_2$
$C_{16}H_{29}NHCH_2CH_2CH_2NH_2$
$C_{18}H_{35}NHCH_2CH_2CH_2NH_2$
$C_{18}H_{33}NHCH_2CH_2CH_2NH_2$
$C_{20}H_{41}NHCH_2CH_2CH_2NH_2$
$C_{24}H_{49}NHCH_2CH_2CH_2NH_2$
$C_{30}H_{61}NHCH_2CH_2CH_2NH_2$
$C_{18}H_{37}NHCH_2CH=CHNH_2$
$C_{16}H_{31}NHCy-C_6H_{10}NH_2$

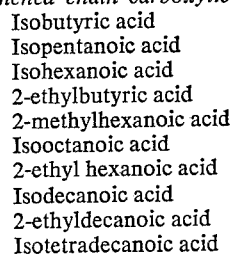

and mixtures thereof (the $C_{12}$–$C_{30}$ radicals are generally derived from fatty acids).

*Branched chain carboxylic acids*:
Isobutyric acid
Isopentanoic acid
Isohexanoic acid
2-ethylbutyric acid
2-methylhexanoic acid
Isooctanoic acid
2-ethyl hexanoic acid
Isodecanoic acid
2-ethyldecanoic acid
Isotetradecanoic acid
Isooctadecanoic acid
2-ethyloctadecanoic acid
Cyclopentane carboxylic acid
Cyclohexane carboxylic acid
Benzoic acid
Phenyl acetic acid
Isobutenoic acid
Isopentenoic acid
Isohexenoic acid
2-ethylbutenoic acid
2-methylhexenoic acid
Isooctenoic acid
2-ethylhexenoic acid
Isodecenoic acid
2-ethyldecenoic acid
Isotetradecenoic acid
Iso-oleic acid
2-ethyl oleic acid
Cyclopentene carboxylic acid
Cyclohexene carboxylic acid
Naphthoic acid
Cyclohexylacetic acid and mixtures thereof.

We have found that the branched-chain (including aromatic and alicyclic) acid salts of fatty diamines are soluble in gasoline and inhibit ice formation in a carburetor in which the gasoline is used. These fatty diamine salts have the outstanding advantage of not crystallizing out of concentrated solution in hydrocarbons at sub-freezing temperatures (e.g. 30° F. to −30° F.), and give enhanced carburetor cleanliness.

In order to describe the advantages resulting from the gasoline compositions which constitute this invention, it is desirable to set forth in more detail an explanation of the methods of comparing gasoline compositions for anti-icing properties and for carburetor cleanliness.

*Test Method for Determining Throttle Icing Tendency of Gasoline*

A single-cylinder CFR engine, maintained at contant speed, with mixture induction by means for a modified carburetor contained in a constant-temperature humidity chamber, comprises the test apparatus. A test is begun after operation conditions have been stabilized by setting the throttle to provide a specific differential pressure (i.e., manifold vacuum). This serves to position the throttle plate at the start of each test more accurately than a mechanical stop.

Thereafter, the time required to form sufficient throttle ice to produce a 0.1 in. Hg rise in manifold vacuum is carefully observed and reported as the "critical icing point." Total elapsed times for vacuum readings to increase 4 in. Hg, in increments of 0.1 in., are also recorded.

A ¾ inch bore, restricted air bleed, Tillotson carburetor with choke and throttle plates removed is used to provide the air-fuel mixture. The float level of this carburetor is raised to provide an essentailly constant air-fuel ratio in the manifold vacuum range of 8 to 12 in. Hg.

Either of two throttle assemblies are used in this apparatus; one of glass, the other of steel. Both throttle assemblies have the usual brass throttle plates. The glass assembly is used to verify the relationship between throttle icing and vacuum rise, as the formation of ice may be directly observed. The steel throttle body is insulated from the rest of the assembly by two Teflon blocks to increase test severity.

The carburetor and throttle assemblies are located within an insulated chamber, flooded with conditioned air. A CFR ice-tower provides a supply of saturated (26–28 grains moisture/pound dry air) air at a nominal temperature of 32° F., which is tempered by means of an accurately controlled immersion heater, sensitive to chamber temperature. A blower on the tower and an exhauster on the chamber provides a sufficient flow of air to maintain conditions of 39.9°–40.1° F. and 75–80% relative humidity at substantially atmospheric pressure. Surplus air from the chamber is used to keep the fuel supply line at reduced temperature. Provision for refrigerating test fuel samples is provided by means of an ice tub.

The established test procedure using this apparatus is as follows: (1) The engine is motored for a five minute de-icing and soak period with the fuel and ignition shut off. This serves to purge the throttle of any accumulated ice, and standardizes the throttle body temperature. (2) The throttle is then set at 8 in. Hg manifold vacuum, the fuel and ignition turned on, and the clock started, initiating a test. In practice, the manifold vacuum drops slightly when fuel is admitted to the carburetor, in proportion to the amount of fuel which vaporizes on the downstream side of the throttle. Engine speed is also momentarily reduced as the ignition is switched on, to obviate the possibility of transitional backfiring. (3) The total time in minutes is recorded to reach 8.1 in. Hg ("Critical Icing Point"), and for subsequent 0.1 in. Hg increments, as icing becomes more severe, to a maximum value of 12 in. Hg, at which time test is terminated. (4) The carburetor float bowl and all fuel lines are drained during the ensuing de-icing and soak period.

A base gasoline is evaluated in the apparatus just described in accordance with the aforementioned test procedure, and the manifold vacuum plotted against test time. Thus, similar evaluations are made for the gasoline with various incremental amounts of isopropyl alcohol up to 2.5%. The values established for various alcohol concentrations are taken as base points for comparison with other additives being tested for anti-icing effectiveness. The various anti-icing additives evaluated in accordance with this invention are compared by this test to the equivalent amount of isopropyl alcohol which would give substantially identical anti-icing properties to the fuel.

Since the addition of anti-icing additives to gasoline sometimes adversely affects the tendency of the fuel to produce carburetor deposits, the additives evaluated in accordance with this invention were tested in accordance with the following test procedure for carburetor deposit characteristics.

*Carburetor Deposit Test Procedure*

Under adverse atmospheric conditions of smog, contaminated air, (and also during use of fuels containing certain deposit-inducting additives) there is a tendency for carburetors to become fouled with a hard, black deposit at the edge of the throttle plate. At the idle position, a ring of the deposit builds on the throttle body and restricts the flow through the narrow throttle opening. Four-barrel carburetors having very small throttle openings at idle are most susceptible to fouling. Since these deposits restrict air flow, the results are a rough engine idle and frequent stalling.

It is a generally accepted fact that blow-by gases contribute most of the gummy materials which bind exhaust soot and dust into a hard black deposit. Trouble is frequently encountered in vehicles which are allowed to idle for extended periods, particularly when the engine is worn to the point of excessive blow-by. This problem is also promoted under congested driving conditions. Solvent or detergent action of the gasoline flowing over these deposits during part or full throttle operation can remove them after each idle period.

Various fuels tested in accordance with this invention were evaluated in a 235 cubic inch, 6-cylinder Chevrolet engine. The carburetor was modified by installing a glass throttle body. An external idle passage was installed, with one needle valve to control fuel flow and a second valve to bleed in a small amount of air. This idle passage terminated in a copper tube nozzle mounted under the throttle plate. The rocker cover vents were sealed, and a crankcase breather was piped into the inlet air filter, thus feeding all fo the blow-by gases into the inlet air. The second compression ring was removed from each piston to increase the volume of blow-by. A further contribution to deposits was made by exhaust gas taken from a ⅛ inch pipe tapped into the engine exhaust pipe.

Using this apparatus, the fuels were tested for deposit-forming tendency at an engine speed of 500–600 r.p.m. for a period of 7½ hours. At 15-minute intervals, the throttle was opened momentarily for five accelerations to 2,000 r.p.m. in rapid succession. The deposits formed on the glass throttle body were rated numerically by visual inspection. The evaluation scale ranged from 10 to 1, with 10 representing a completely clean throttle body and 1 representing a substantially completely blackened throttle body.

The following nonlimiting examples are illustrative of the scope of this invention.

EXAMPLE I

Diamine salts were prepared by reacting one molar equivalent of N-ocetadecenyl trimethylene diamine (Duomeen-0), N-tallow trimethylene diamine (Duomeen-T), and N-dodecyl trimetyhlene diamine (Duomeen-12), respectively, with 2 molar equivalents of isodecanoic acid (mixed isomers). Reaction was carried out by mixing, heating, and stirring each of the mixtures of 160°–175° F. for about 15 minutes. Each of the products, when chilled to $-30°$ F., solidified as a glass which, when diluted with gasoline or other hydrocarbons, was fluid at temperatures of $-30°$ F. and lower, showing no tendency to crystallize from solution. Small portions of these products were added to a gasoline of the following composition and properties.

Base gasoline [1]

| | |
|---|---|
| Reid vapor pressure | 12.5 |
| A.P.I. gravity | 61.5 |
| ASTM distillation, ° F.: | |
| IBP | 87 |
| 5 | 96 |
| 10 | 107 |
| 20 | 125 |
| 30 | 146 |
| 40 | 167 |
| 50 | 195 |
| 60 | 229 |
| 70 | 271 |
| 80 | 316 |
| 90 | 364 |
| 95 | 400 |
| E.P. | 420 |

[1] Base gasoline contains TEL, 3 ml./gal.

Hydrocarbon composition:

| | |
|---|---|
| Paraffins and Naphthenes | 52 |
| Olefins | 32 |
| Aromatics | 16 |

The hydrocarbon composition probably has little effect on icing characteristics of the base gasoline but the RVP and distillation are of primary importance. The additives were used in a concentration of 60 p.p.m. (parts per million). The fuel compositions which were thus prepared were evaluated in accordance with the above-described carburetor test procedure and gave a carburetor cleanliness rating of 9–9.5 (as compared to 10 for an absolutely clean carburetor and 6.5 for the carburetor when operated on the base fuel). Samples of the gasoline containing 60 p.p.m. of the respective additives were tested in accordance with the above described carburetor icing tests, and were found to have icing properties corresponding to the base gasoline when mixed with 0.5–0.75% vol. isopropanol. Other analogous fatty diamine salts give similar effects. For example, the isodecanoic acid, benzoic acid, and cyclohexane carboxylic acid salts of Duomeen-S (N-soya trimethylene diamine, soya representing a mixture of aliphatic radicals derived from soya oil), when dissolved in gasoline in a concentration of 10–200 p.p.m. give similar anti-icing and detergency effects.

EXAMPLE II

A number of additional diamine salts were prepared as described in Example I by heating the respective diamines and branched chain carboxylic acids. These products are tabulated in the following table which shows the diamine and acid used to prepare the respective additives.

TABLE

| Sample No. | Diamine reactants | Acid |
|---|---|---|
| 1 | Duomeen-O [1] | Isopentanoic acid. |
| 2 | Duomeen-O | Isooctanoic acid. |
| 3 | Duomeen-O | Benzoic acid. |
| 4 | Duomeen-O | Isodecanoic acid. |
| 5 | Duomeen-T [2] | Do. |
| 6 | Duomeen-12 [3] | Do. |
| 7 | Duomeen-O | Cyclohexane carboxylic acid. |
| 8 | Duomeen-O | 2-ethylbutyric acid. |
| 9 | N-benzyl trimethylenediamine. | 2-ethylhexanoic acid. |

[1] Product of Armour & Company, N-octadecenyl trimethylene diamine.
[2] Product of Armour & Company, N-tallow trimethylene diamine (tallow is a mixture of $C_{12}$–$C_{18}$ alkyl and alkenyl radicals derived from beef tallow.)
[3] Product of Armour & Company, N-dodecyl trimethylene diamine.

Each of samples 1 to 9 inclusive was a liquid which set to a clear solid glass at 0° F. In each case, the product was hydrocarbon-soluble and, when diluted with gasoline or other hydrocarbons, remained fluid without any precipitation from solution at temperatures of −30° F. and lower. Samples 1 to 9 inclusive were dissolved in the base gasoline described in Example I at concentrations of 20 to 60 p.p.m. At these concentrations, the additives gave a carburetor cleanliness rating of 8.5–9.5, compared to 10.0 for an absolutely clean carburetor and 6.5 for the condition of the carburetor operated on the base fuel. At these concentrations the additives have an anti-icing effect equivalent to about 0.50% vol. (5,000 p.p.m.) isopropyl alcohol.

EXAMPLE III

In another series of experiments, several diamine salts were prepared from straight-chain acids to demonstrate the substantial unsuitability of those salts for use in concentrated solutions to be added to gasolines in the field as anti-icing and detergent additives. N-octadecenyl trimethylenediamine (Duomeen-O) was heated with n-decanoic acid to yield the di-acid salt. This material set into a wax-like solid when cooled to 0° F. When this material was dissolved in gasoline, it formed a fine, wax-like precipitate upon cooling to 0° F., with the result that the wax particles tended to agglomerate and settle out in time.

N-octadecenyl trimethylene diamine (Duomeen-O) was reacted with 2 molar equivalents of oleic acid to produce a liquid product which set into a wax-like solid at 0° F. This product, when dissolved in gasoline, formed a wax-like precipitate upon cooling to 0° F. N-octadecenyl trimethylene diamine (Duomeen-O) was reacted with 2 moles of tall oil fatty acids to produce a product which set into a wax-like solid at 0° F. This product, when dissolved in gasoline, forms a precipitate upon cooling to 0° F. or lower. Other fatty diamines of the type discussed above can be reacted with straight-chain fatty acids to form fatty diamine salts. These salts are hydrocarbon-soluble, but precipitate out in the form of fine, wax-like particles upon cooling to a temperature substantially lower than 30° F.

From the experiments which we have carried out, we have found that there is no substantial variation in anti-icing characteristics or in detergency characteristics for the various fatty diamine salts of branched-chain carboxylic acids when they are dissolved in gasoline in concentrations in the range from about 10 to 200 p.p.m. Furthermore, these branched-chain carboxylic acids salts in all form solid, glass-like solids when cooled to about 0° F. and can be diluted with gasoline or other hydrocarbons to form concentrated solutions from which there is no tendency to precipitate solid material upon cooling to −30° F. and lower. The straight-chain acid salts of the same fatty diamines are hydrocarbon-soluble and have some anti-icing and detergent properties, but tend to precipitate in the form of solid, wax-like particles upon cooling to any substantial degree below 30° F.

While we have described our invention fully and completely with special emphasis upon several preferred embodiments, we wish it to be understood that within the scope of the appended claims this invention can be practiced otherwise than as specifically described herein.

The embodiments of the invention in which an exclusive property or privilege is claimed are defined as follows:

We claim:

1. A gasoline composition consisting essentially of hydrocarbons boiling in the gasoline boiling range containing a small amount, sufficient to inhibit carburetor ice formation, of a diamine salt of the formula

where R is a $C_{12}$–$C_{30}$ hydrocarbon radical, $R^1$ is a $C_2$–$C_{20}$ divalent hydrocarbon radical, and $R^2$ is a $C_4$–$C_{30}$ branched chain carboxylic acid.

2. A gasoline composition in accordance with claim 1 in which diamine salt is present in a concentration of 10 to 200 p.p.m.

3. A gasoline composition in accordance with claim 1 which contains an amount of a tetraalkyl lead composition sufficient to inhibit knock.

4. A gasoline composition in accordance with claim 1 in which $R^1$ is —$CH_2CH_2CH_2$— and R is a mixture of hydrocarbon radicals derived from fatty acids.

5. A leaded gasoline containing 10 to 200 p.p.m. of a diamine salt of the formula

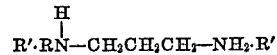

where R is a hydrocarbon radical derived from oleic acid and R' is a $C_4$–$C_{30}$ branched-chain carboxylic acid.

6. A leaded gasoline containing 10 to 200 p.p.m. of a diamine salt of the formula

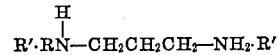

where R is a hydrocarbon radical derived from soya oil and R' is a $C_4$–$C_{30}$ branched-chain carboxylic acid.

7. A leaded gasoline containing 10 to 200 p.p.m. of a diamine salt of the formula

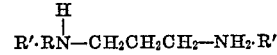

where R is a hydrocarbon radical derived from soyal oil and R' is a $C_4$–$C_{30}$ branched-chain carboxylic acid.

8. A leaded gasoline containing 10 to 200 p.p.m. of a diamine salt of the formula

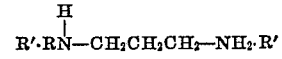

where R is a hydrocarbon radical derived from lauric acid and R' is a $C_4$–$C_{30}$ branched-chain carboxylic acid.

9. A leaded gasoline containing 10 to 200 p.p.m. of a diamine salt of the formula

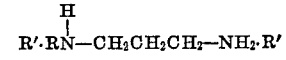

where R is a hydrocarbon radical derived from oleic acid and R' is isodecanoic acid.

10. A leaded gasoline containing 10 to 200 p.p.m. of a diamine salt of the formula

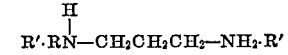

where R is a hydrocarbon radical derived from tallow and R' is isodecanoic acid.

11. A leaded gasoline containing 10 to 200 p.p.m. of a diamine salt of the formula

where R is a hydrocarbon radical derived from soya oil and R′ is isodecanoic acid.

12. A leaded gasoline containing 10 to 200 p.p.m. of a diamine salt of the formula

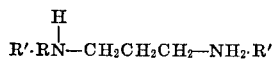

where R is a hydrocarbon radical derived from lauric acid and R′ is isodecanoic acid.

13. A leaded gasoline containing 10 to 200 p.p.m. of a diamine salt of the formula

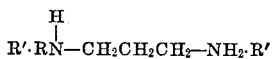

where R is a hydrocarbon radical derived from oleic acid and R′ is cyclohexanecarboxylic acid.

14. A leaded gasoline containing 10 to 200 p.p.m. of a diamine salt of the formula

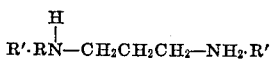

where R is a hydrocarbon radical derived from oleic acid and R′ is benzoic acid.

References Cited

UNITED STATES PATENTS

| | | | |
|---|---|---|---|
| 2,862,800 | 12/1958 | Cantrell et al. | 44—71 |
| 2,982,632 | 5/1961 | Andress | 44—71 |
| 3,251,853 | 5/1966 | Hoke | 44—66 |

FOREIGN PATENTS

| | | |
|---|---|---|
| 200,748 | 1/1956 | Australia. |
| 793,448 | 4/1958 | Great Britain. |

OTHER REFERENCES

"Duomeens," Armour Chemical Co., received in Patent Office Feb. 21, 1956, pps. 2–4.

Petroleum Refining with Chemicals—Kalichevsky et al., Second Edition, Elsevier Publ. Co., 1956, p. 480.

PATRICK P. GARVIN, *Primary Examiner.*

U.S. Cl. X.R.

44—69, 71